(12) United States Patent
Kayukawa

(10) Patent No.: US 6,845,969 B2
(45) Date of Patent: Jan. 25, 2005

(54) VALVE AND SEALING STRUCTURE THEREFOR

(75) Inventor: Hisashi Kayukawa, Gifu (JP)

(73) Assignee: Pacific Industrial Co., Ltd., Gifu (JP)

( * ) Notice: Subject to any disclaimer, the term of this patent is extended or adjusted under 35 U.S.C. 154(b) by 55 days.

(21) Appl. No.: 10/339,979

(22) Filed: Jan. 10, 2003

(65) Prior Publication Data

US 2004/0026651 A1 Feb. 12, 2004

(30) Foreign Application Priority Data

Aug. 7, 2002 (JP) ......................................... 2002-230250

(51) Int. Cl.[7] ............................................. F16K 51/00
(52) U.S. Cl. .................... 251/334; 251/900; 137/454.6; 137/234.5
(58) Field of Search ................................. 251/334, 900; 137/454.6, 234.5; 152/427

(56) References Cited

U.S. PATENT DOCUMENTS

| | | | | |
|---|---|---|---|---|
| 1,050,491 A | * | 1/1913 | Schweinert et al. | ...... 137/234.5 |
| 2,022,545 A | * | 11/1935 | Marken | ....... 152/427 |
| 2,835,305 A | * | 5/1958 | Boyer | ......... 152/427 |
| 2,874,749 A | * | 2/1959 | Brink | .......... 152/427 |
| 3,019,832 A | * | 2/1962 | Williams | ..... 152/427 |
| 3,217,733 A | * | 11/1965 | Howard et al. | ............. 152/427 |
| 4,049,037 A | | 9/1977 | Gale et al. | |
| 4,282,896 A | * | 8/1981 | Makino | ....... 137/495 |
| 4,340,080 A | * | 7/1982 | Lefrancois | ................. 137/223 |
| 4,659,059 A | * | 4/1987 | Morris et al. | ............ 137/454.6 |

FOREIGN PATENT DOCUMENTS

| | | |
|---|---|---|
| JP | S58-100102 | 7/1983 |
| JP | 01-169181 | 7/1989 |
| JP | 2001-287521 | 10/2001 |

* cited by examiner

*Primary Examiner*—John Bastianelli
(74) *Attorney, Agent, or Firm*—Akin Gump Strauss Hauer & Feld, LLP

(57) ABSTRACT

A valve is generally elongated in shape and is inserted through an O-ring and amounting hole formed through a plate-shaped member. The valve includes a thread formed on an outer circumferential face of the valve so that a generally annular fitting is engaged therewith, an outer protruding wall protruding from the outer circumferential face of the valve to hold a circumferential edge of the mounting hole in cooperation with the fitting, a tapered portion formed in the outer protruding wall so as to be tapered toward the fitting and so as to abut against a part of the circumferential edge of the mounting hole, and a sealing portion disposed at a side farther away from the plate-shaped member than a portion of the protruding wall abutting against said circumferential edge part of the mounting hole so that each of the plate-shaped member and the sealing portion presses the O-ring against the other.

17 Claims, 5 Drawing Sheets

VALVE AND SEALING STRUCTURE THEREFOR

BACKGROUND OF THE INVENTION

1. Field of the Invention

This invention relates to a valve which is generally elongated and is mounted in a mounting hole formed through a plate-shaped member and a sealing structure for such a valve.

2. Description of the Related Art

FIG. 5 illustrates a conventional valve 1 of the type described above. The valve 1 includes a generally annular flange 2 formed on a proximal end thereof. A grommet 3A is provided on a circumferential portion of the flange 2. The valve 1 is inserted through a mounting hole 4A formed in a steel plate 4, for example. Another grommet 3B and an annular fitting 5 are fitted with a part of the valve 1 having passed through the mounting hole 4A, in turn. The fitting 5 is brought into thread engagement with an outer thread of the valve 1 so that the valve is fixed in position with the steel plate 4 being held between the flange 2 and the fitting 5.

In the above-described conventional valve 1, however, the grommets 3A and 3B are held between the flange 2 and the fitting 5 as well as the steel plate 4. Elastic deformation of each grommet renders the valve unstable. This entails a problem.

SUMMARY OF THE INVENTION

Therefore, an object of the present invention is to provide a valve which can stably be fixed to the plate-shaped member and a sealing structure for the valve which can improve the sealing performance.

The present invention provides a valve which is generally elongated in shape and is inserted through an O-ring and a mounting hole formed through a plate-shaped member in turn. The valve comprises a thread formed on an outer periphery of the valve so that a generally annular fitting is brought into thread engagement therewith, an outer protruding wall protruding from the outer periphery of the valve to hold a circumferential edge of the mounting hole in cooperation with the fitting, a tapered portion formed in the outer protruding wall so as to be tapered toward the fitting and so as to abut against a part of the circumferential edge of the mounting hole, and a sealing portion disposed at a side farther away from the plate-shaped member than a portion of the protruding wall abutting against said circumferential edge part of the mounting hole so that each of the plate-shaped member and the sealing portion presses the O-ring against the other.

Upon insertion of the valve through the mounting hole, the tapered portion of the outer protruding wall strikes the circumferential edge part of the mounting hole and each one of the sealing portion and the plate-shaped member presses the O-ring against the other. When the annular fitting is tightened up at the side opposed to the outer protruding wall, the circumferential edge part of the mounting hole and tapered portion adhere closely to each other, whereby metal seal is provided. Further, the O-ring is pressed against the sealing portion and the plate-shaped member thereby to adhere closely to them. Since the metal seal and the O-ring provide a double sealing structure, the sealing performance can be improved in the valve as compared with the conventional construction. Moreover, the valve can stably be fixed to the plate-shaped member since the plate-shaped member is held directly between the outer protruding wall of the valve and the annular fitting in thread engagement with the valve. Additionally, the machining cost can be prevented from being increased since no O-ring groove is required.

The sealing portion is preferably a part of the tapered portion. In this case, the O-ring is pressed against the tapered portion to be deformed so that the diameter thereof is increased, thereby adhering closely to the tapered portion and the plate-shaped member. Consequently, freedom in the size of the usable O-ring can be improved. Further, the sealing portion preferably includes a flange formed at a side farther away from the plate-shaped member than the tapered portion and disposed opposite the plate-shaped member. Further, the tapered portion is preferably inclined at an angle ranging from 25 to 50 degrees to a longitudinal axis of the valve. Additionally, the sealing performance of the metal seal can be improved when either one of the circumferential edge part of the mounting hole and the tapered portion is depressed by the other, thereby adhering closely to the other.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF THE INVENTION

Figure 1:
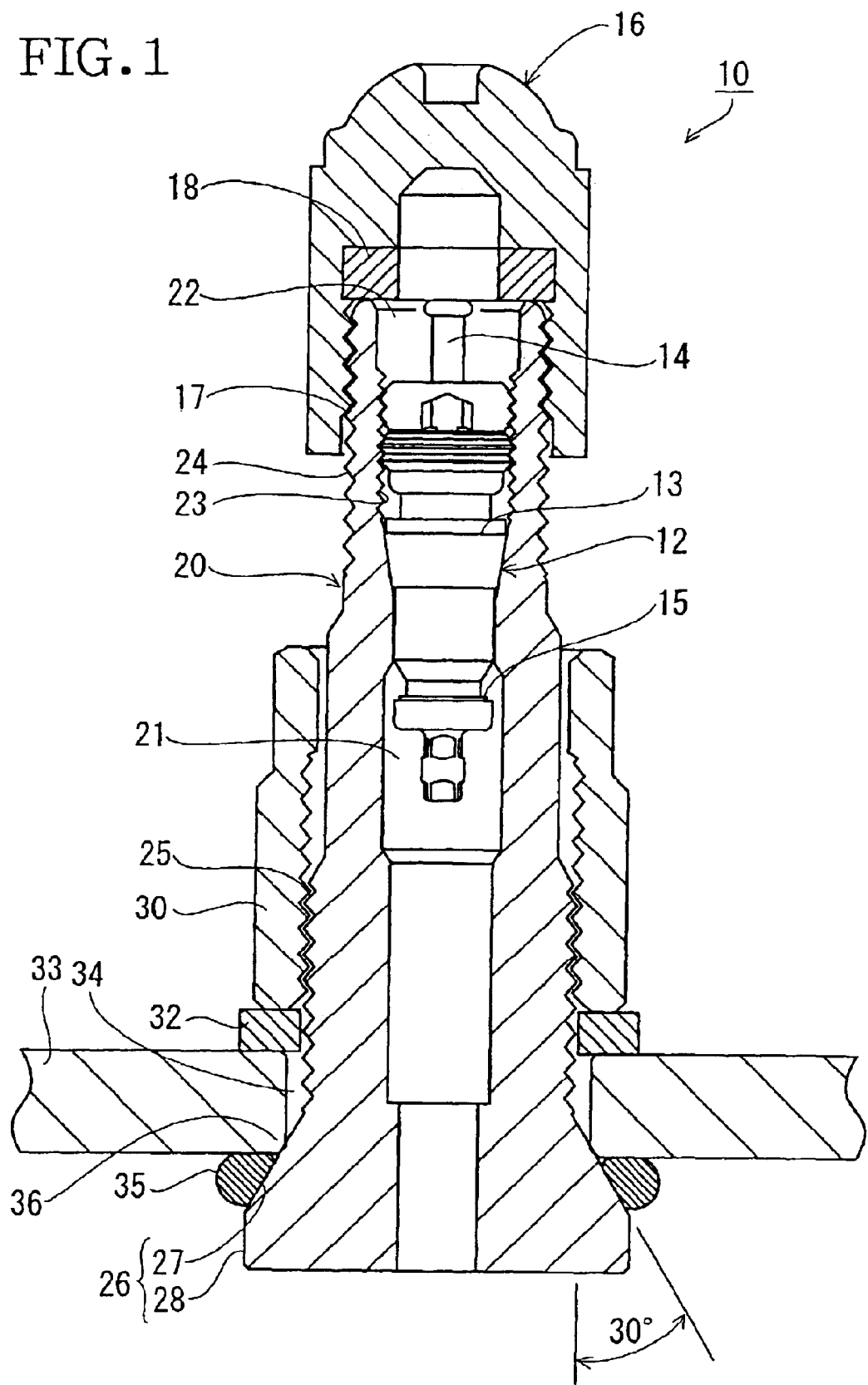
FIG. 1 is a sectional view of the valve of a first embodiment in accordance with the invention.

A first embodiment of the invention will be described with reference to FIGS. 1 to 3. Referring to FIG. 1, the valve 10 in accordance with the invention is shown. The valve 10 is generally elongated and includes a generally cylindrical valve stem 20 and a valve core 12 provided in the valve stem. The valve stem 20 is made from brass, for example and has a central bore or an axial flow path 21 extending through the valve stem. The valve stem 20 is tapered from its proximal end toward its distal end and has an opening of the flow path 21 at the distal end thereof. The opening serves as a charging hole 22 through which a compressed gas is charged. The valve stem 20 has a female thread 23 formed in an inner periphery thereof located in the vicinity of the distal end.

The valve core 12 includes a cylindrical core body 13 and a moving shaft 14 extending through the core body 13. A coil spring (not shown) provided in the core body 13 urges the moving shaft 14 toward one side so that a valve element 15 provided on one end of the shaft 14 is pressed against one end surface of the core body 13. As a result, the valve core 12 is usually closed such that the flow path 21 of the valve 10 is shut off. When the moving shaft 14 is pushed at the charging hole 22 or when the charging hole 22 is charged with a compressed gas, the valve element 15 departs from the end surface of the core body 13 so that the valve core 12 is opened, whereupon the flow path 21 is open.

The valve stem 20 has a first male thread 24 formed in an outer circumferential face thereof at the distal end side. A valve cap 16 is brought into thread engagement with the first male thread 24. The valve cap 16 is formed into the shape of a bottomed cylinder and includes an annular rubber plate 18 laid on an inner face thereof. The valve cap 16 has a thread 17 formed in an inner circumferential face thereof. When the thread 17 of the valve cap 16 is brought into thread engagement with the first male thread 24 of the valve stem 20, the distal end of the valve stem 20 is pressed against the rubber plate 18 such that the charging hole 22 is closed.

The valve stem 20 has a second male thread 25 formed in the outer circumferential face thereof at the proximal end side and serving as a thread in the present invention. The valve stem 20 further has an outer protruding wall 26 protruding sideways from the proximal end thereof. An annular fitting 30 is brought into thread engagement with the second male thread 25. The fitting 30 is formed into a cylindrical shape and has a thread in an inner circumferential face thereof. The fitting 30 has a distal end with a polygonal outer face to which a thread fastening tool is applied.

The protruding wall 26 includes a tapered portion 27 continuous to the second male thread 25. The tapered portion 27 serves both as a tapered portion and as a sealing portion in the invention. The tapered portion 27 is inclined at an angle of about 30 degrees to a central axis of the valve stem 20. The protruding wall 26 further includes a cylindrical portion 28 which is continuous to a large-diameter side of the tapered portion 27 and has a uniform outer diameter.

A manner of mounting the valve 10 in a mounting hole 34 of the plate-shaped member 33 will now be described. In the embodiment, the plate-shaped member 33 is a part of steel plate composing a tire wheel, for example. Firstly, an O-ring 35 is fitted with the valve 10 so as to be located over the tapered portion 27. The O-ring 35 is sized so as to be pressed against the plate-shaped member 33 and the tapered portion 27 while the tapered portion is in abutment with a part (36) of a circumferential edge of the mounting hole 34.

The valve 10 is then inserted through the mounting hole 34 of the plate-shaped member 33 from the distal end side thereof. A washer 32 is fitted with a portion of the valve 10 having passed through the mounting hole 34. The annular fitting 30 is further fitted with the valve 10 to be engaged with the second male thread 25 of the valve 10. As a result, the tapered portion 27 of the valve 10 comes close to the circumferential edge part 36 of the mounting hole 34 such that the O-ring 35 is held between the tapered portion 27 and the plate-shaped member 33.

Figure 2:
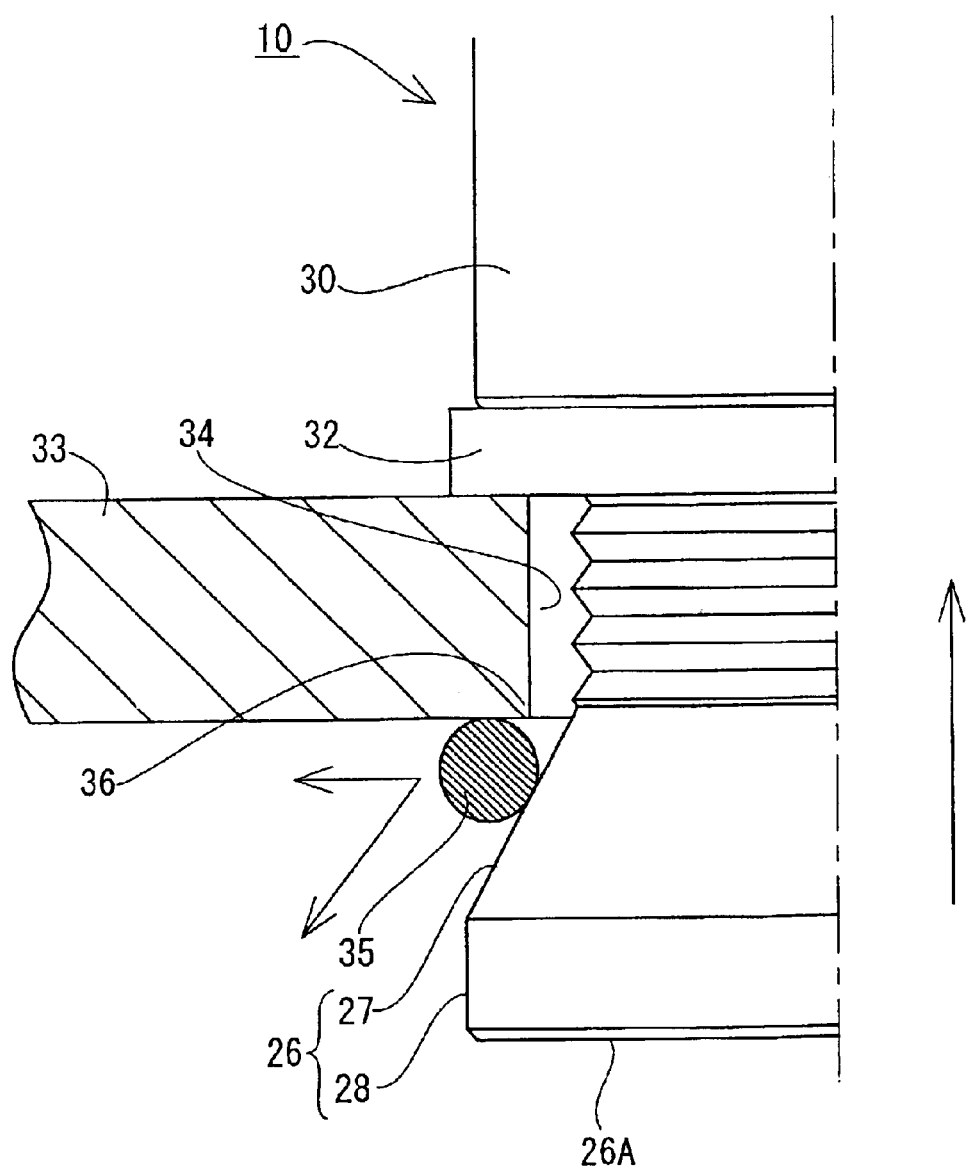
FIG. 2 is a partially enlarged view of the valve, showing an O-ring located between a tapered portion and a plate-shaped member.
Figure 3:
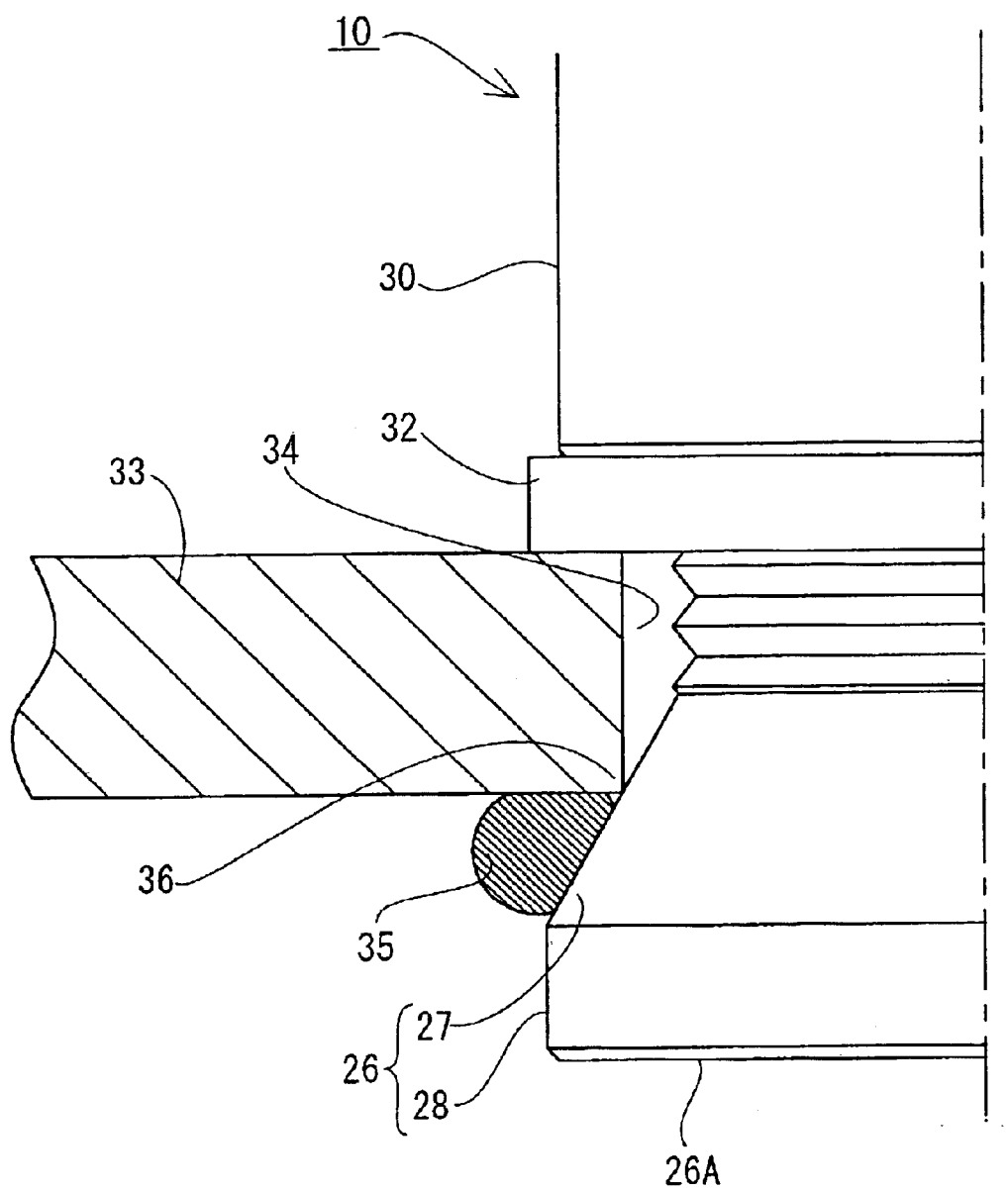
FIG. 3 is also a partially enlarged view of the valve, showing the O-ring which is deformed thereby to adhere closely to the tapered portion and the plate-shaped member.
Figure 5:
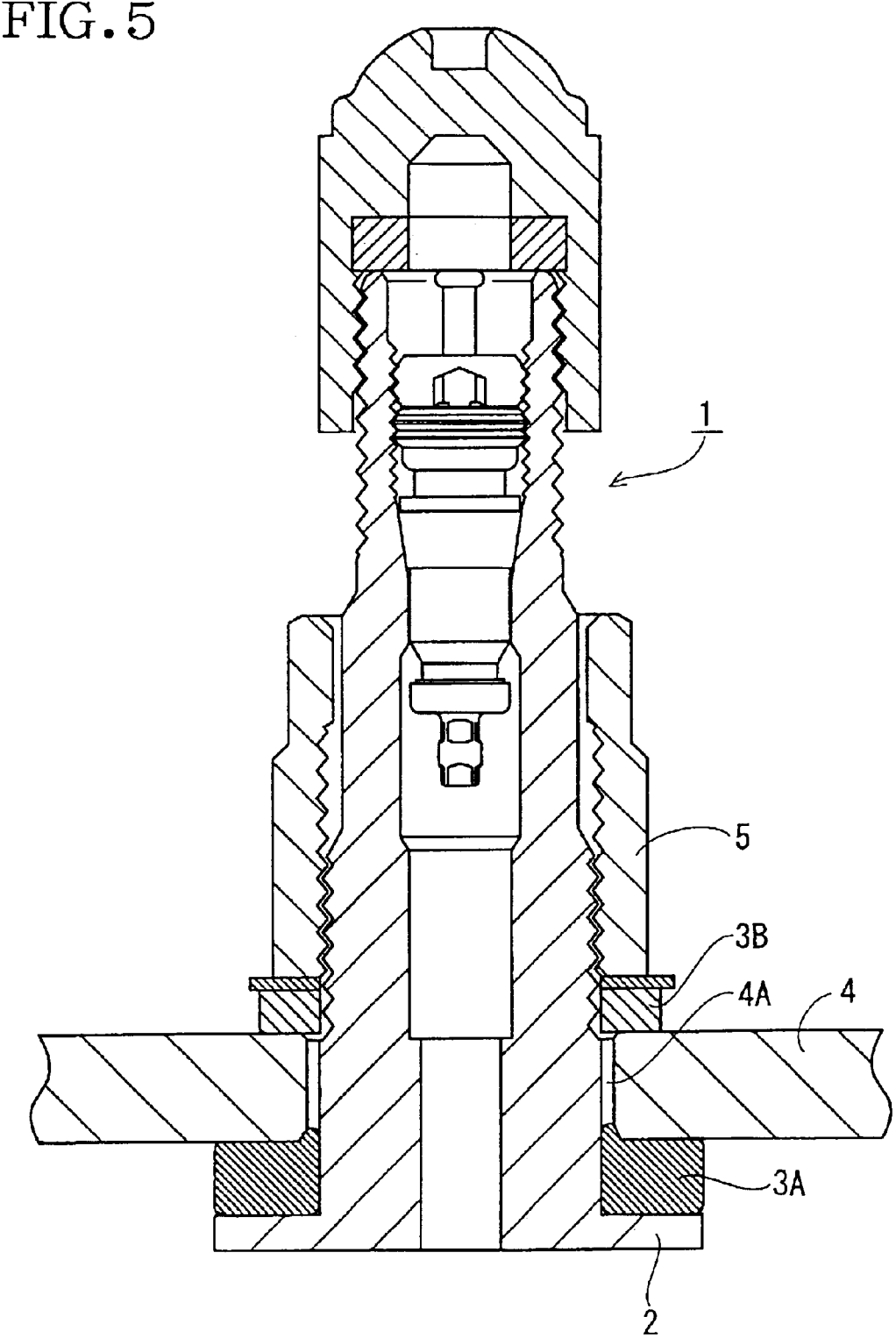
FIG. 5 is also a view similar to FIG. 1, showing a conventional valve.

With progress in the thread engagement of the fitting 30 and the valve 10, the tapered portion 27 comes closer to the plate-shaped member 33, and with this, each one of the tapered portion 27 and the plate-shaped member 33 presses the O-ring 35 against the other, as shown in FIG. 2. As a result, the O-ring 35 is displaced toward the large-diameter side so that the diameter thereof is increased. A resultant restoring force presses the O-ring 35 into a narrower part of a space between the tapered portion 27 and the plate-shaped member 33 such that the O-ring 35 adheres closely to both of them, as shown in FIG. 5.

With further progress in the thread engagement of the fitting 30 and the valve 10, the edge 36 of the mounting hole 34 abuts against the middle of the tapered portion 27. Since the valve stem 20 is made from brass and the plate-shaped member 33 is made from steel, the circumferential edge part 36 bites into the tapered portion 27 thereby to adhere closely to the latter, whereupon metal seal is provided.

In the foregoing embodiment, a double sealing structure is provided by the metal seal and the O-ring 35. Consequently, the sealing performance can be improved as compared with the conventional valves. Further, the valve can be fixed stably since the plate-shaped member 33 is held directly between the protruding wall 26 of the valve 10 and the fitting 30. Further, the O-ring 35 is pressed against the tapered portion 27 to be deformed so that the diameter thereof is increased, thereby adhering closely to the tapered portion 27 and the plate-shaped member 33. Consequently, the freedom in the size of the O-ring 35 can be improved. Additionally, an increase in the machining cost can be restrained since nothing that requires a high machining accuracy, such as an O-ring groove, is necessary.

Figure 4:
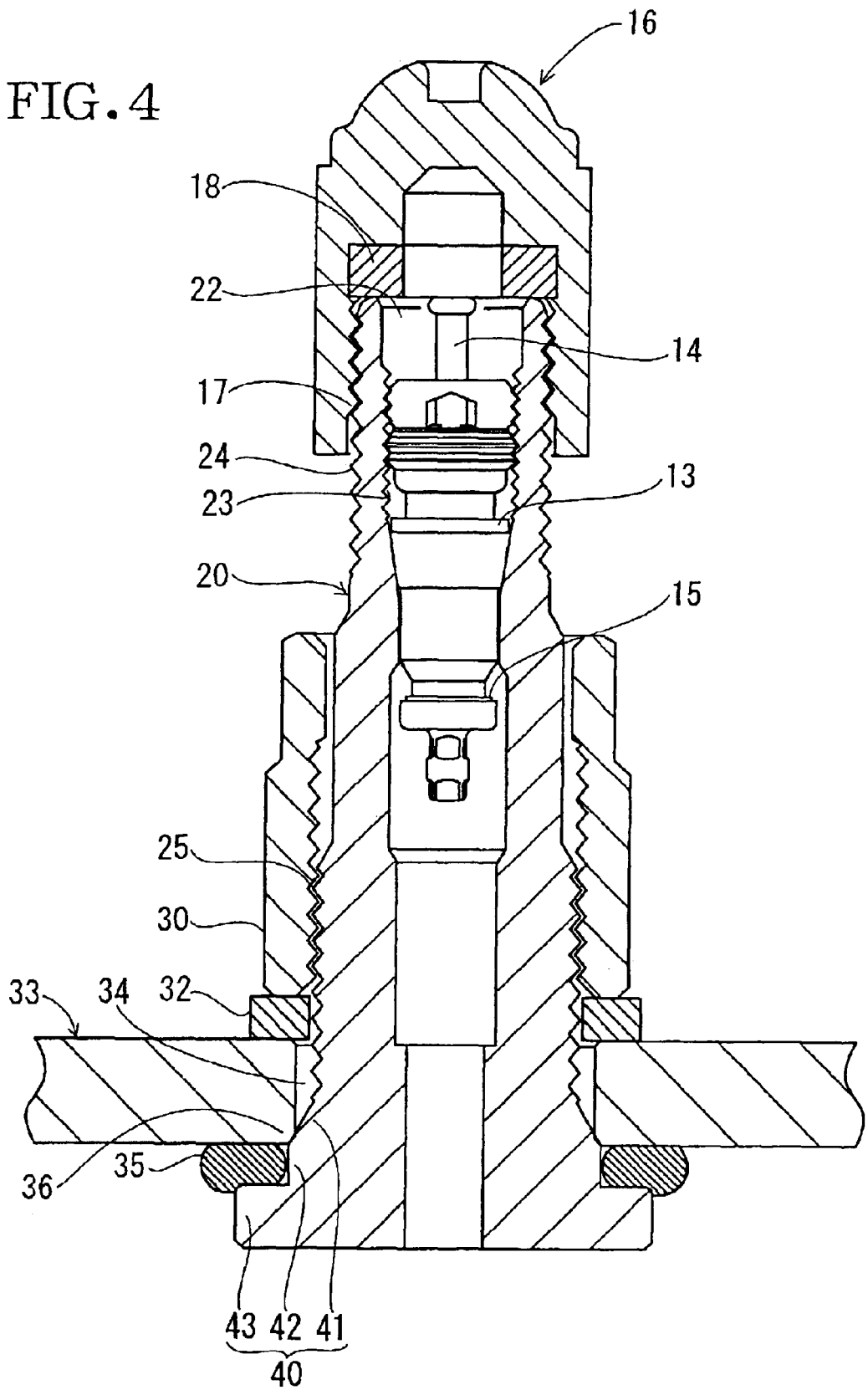
FIG. 4 is a view similar to FIG. 1, showing the valve of a second embodiment in accordance with the invention.

FIG. 4 illustrates a second embodiment of the invention. The second embodiment differs from the first embodiment in the structure of the outer protruding wall. The outer protruding wall 40 includes a tapered portion 41 caused to abut against the circumferential edge part 36 of the plate-shaped member 33, a cylindrical portion 42 having a uniform outer diameter, and a flange 43 protruding sideways from the cylindrical portion. The tapered portion 41, cylindrical portion 42 and flange 43 are formed sequentially from the distal end side. The O-ring 35 attached to the outer face of the cylindrical portion 42 is held between the plate-shaped member 33 and the flange 43. The other construction in the second embodiment is the same as that in the first embodiment. Identical or similar parts in the second embodiment are labeled by the same reference symbols as those in the first embodiment, as shown in FIG. 4, and the description of these parts will be eliminated. The same effect can be achieved from the second embodiment as from the first embodiment.

In the first embodiment, the outer diameter of the O-ring 35 is larger than the outer diameter of the protruding wall 26 when the valve 10 is fixed to the plate-shaped member 33, as shown in FIG. 1, whereupon a part of the O-ring 35 projects radially outward from the wall 26. However, the O-ring may be protected so as not to project radially outward from the protruding wall, instead.

However, the size of the valve can be reduced when the outer diameter of the protruding wall is smaller than that of the O-ring, as in the valve 10 of the first embodiment. The protruding wall 26 of the valve 10 in the first embodiment can be rendered smaller in size than the flange 2 of the conventional valve 1 as shown in FIG. 5. Accordingly, when the plate-shaped member with a mounting hole is bent at a predetermined curvature in order to constitute a part of a tire wheel, the valve 10 in accordance with the present invention can be mounted on the plate-shaped member having a larger curvature than the conventional valve 1. Consequently, the freedom in the size of a tire wheel in which the valve is used can be improved.

In the first embodiment, the valve 10 is inserted through the mounting hole 34 with the O-ring 35 being located over the tapered portion 27. However, the O-ring may be deformed so that the diameter thereof is increased and attached around the tapered portion after the valve has temporarily been mounted in the mounting hole, instead.

Although the plate-shaped member 33 is a steel plate composing a tire wheel in the first embodiment, other steel plates than that composing the tire wheel may be employed if the plates have respective mounting holes.

The valve of the present invention may be used without the O-ring when substantially no external force is applied to the valve or when an external force applied to the valve is small enough to be ignored.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A valve which is generally elongated in shape and is inserted through an O-ring and a mounting hole formed through a plate-shaped member in turn, the valve comprising:

a thread formed on an outer circumferential face of the valve so that a generally annular fitting is brought into thread engagement therewith;

an outer protruding wall protruding from the outer circumferential face of the valve to hold a circumferential edge of the mounting hole in cooperation with the fitting;

a tapered portion formed in the outer protruding wall so as to be tapered toward the fitting and so as to abut against a part of the circumferential edge of the mounting hole; and a sealing portion disposed at a side farther away from the plate-shaped member than a portion of the protruding wall abutting against said circumferential edge part of the mounting hole so that each of the plate-shaped member and the sealing portion presses the O-ring against the other.

2. A valve according to claim 1, wherein the sealing portion is a part of the tapered portion.

3. A valve according to claim 1, wherein the sealing portion includes a flange formed at a side farther away from the plate-shaped member than the tapered portion and disposed opposite the plate-shaped member.

4. A valve according to claim 1, wherein the tapered portion is inclined at an angle ranging from 25 to 50 degrees to a longitudinal axis of the valve.

5. A valve according to claim 2, wherein the tapered portion is inclined at an angle ranging from 25 to 50 degrees to a longitudinal axis of the valve.

6. A valve according to claim 4, wherein the tapered portion is inclined at 30 degrees to the longitudinal axis of the valve.

7. A valve according to claim 5, wherein the tapered portion is inclined at 30 degrees to the longitudinal axis of the valve.

8. A sealing structure for sealing a generally elongated valve, comprising: a plate-shaped member formed with a through mounting hole through which the valve is inserted; a generally annular fitting engaged with an outer circumferential face of the valve;

an outer protruding wall protruding from the outer circumferential face of the valve to hold a circumferential edge of the mounting hole in cooperation with the fitting;

a tapered portion formed in the outer protruding wall so as to be tapered toward the fitting and so as to abut against a part of the circumferential edge of the mounting hole; and a sealing portion disposed at a side farther away from the plate-shaped member than a portion of the protruding wall abutting against said circumferential edge part of the mounting hole so that each of the plate-shaped member and the sealing portion presses an O-ring against the other.

9. A sealing structure according to claim 8, wherein the sealing portion is a part of the tapered portion.

10. A sealing structure according to claim 8, wherein the sealing portion includes a flange formed at a side farther away from the plate-shaped member than the tapered portion and disposed opposite the plate-shaped member.

11. A sealing structure according to claim 8, wherein either one of said circumferential edge part of the mounting hole and the tapered portion is pressed by the other to be depressed, thereby closely adhering to the other.

12. A sealing structure according to claim 9, wherein either one of said circumferential edge part of the mounting hole and the tapered portion is pressed by the other to be depressed, thereby adhering closely to the other.

13. A sealing structure according to claim 10, wherein either one of said circumferential edge part of the mounting hole and the tapered portion is pressed by the other to be depressed, thereby adhering closely to the other.

14. A sealing structure according to claim 8, wherein the tapered portion is inclined at an angle ranging from 25 to 50 degrees to a longitudinal axis of the valve.

15. A sealing structure according to claim 9, wherein the tapered portion is inclined at an angle ranging from 25 to 50 degrees to a longitudinal axis of the valve.

16. A sealing structure according to claim 15, wherein the tapered portion is inclined at 30 degrees to the longitudinal axis of the valve.

17. A sealing structure according to claim 14, wherein the tapered portion is inclined at 30 degrees to the longitudinal axis of the valve.

* * * * *